United States Patent Office 3,023,125
Patented Feb. 27, 1962

3,023,125
PROCESS OF TREATING COAL TAR IMPREGNATED WOOD WITH A SOLUTION OF A COMPOUND OF BORON TRIFLUORIDE
Karl Friedrich Lang, Frankfurt am Main, Walter Metzendorf, Kronberg (Taunus), Johannes Turowski, Castrop-Rauxel, and Heinrich Gick, Duisburg-Wanheimerort, Germany, assignors to Rutgerswerke-Aktiengesellschaft, Frankfurt am Main, Germany
No Drawing. Filed July 20, 1959, Ser. No. 828,066
Claims priority, application Germany July 25, 1958
6 Claims. (Cl. 117—62)

This invention relates to the treatment of wood and it has particular relation to the improvement of wood which has been treated with impregnating oils.

It has been known to improve wood, which has been impregnated with impregnating oils, by subjecting the wood to the action of gaseous agents which have a polymerizing effect on impregnating oil and as a gaseous agent to be used in this treatment, among others, boron trifluoride has been suggested. The use of gaseous agents in this process renders it necessary that the treatment of the wood be carried out in a particular chamber and it is difficult to obtain a predetermined dosage and uniform distribution of the gaseous agent in the wood.

It has now been found that solutions of addition compounds of boron trifluoride with organic acids, such as formic acid, acetic acid, as well as water, alcohols, phenols and ethers, are likewise capable of bringing about a surface resinification of wood impregnated with oil, particularly impregnating oil obtained by distillation of coal tar.

In carrying out the process of this invention, for example $BF_3$ is introduced into 85 grams of formic acid or acetic acid of 100% until 15 grams of the gaseous $BF_3$ are absorbed. If a piece of pine wood (of the dimensions 8 cm. x 4 cm. x 2 cm.) which has been impregnated with impregnating oil from coal tar, is immersed in said solution of $BF_3$ in acid for 5 minutes and the piece of pine wood thus treated is heated in a drying chamber to 80°–100° C. for 30–60 minutes, the surface of the wood will be completely hardened due to the polymerization of the impregnating oil in the wood. After cooling to ordinary room temperature of e.g. 15–20° C., the pine wood does not give off oil and an oil stain is not formed if the wood is placed on filter paper. The liquid used for hardening the surface of the wood can be applied to the impregnated wood also in other manner, e.g., by spraying.

Solutions of $BF_3$ are obtained in ethers, alcohols, phenols or water, in a manner analogous to that described above and they can be applied to impregnated wood by immersing the impregnated wood in the solution or spraying the solution to the surface to be treated, by a brush or in other suitable manner.

Hardening of the impregnated wood can be obtained also by treating it with an aqueous solution of $HBF_4$ prepared in conventional manner from $B_2O_3$ and HF.

Concentration of the $BF_3$ in the solutions used according to this invention amounts preferably to 15% or more. If complex compounds of $BF_3$ with water or alcohol are used, it is of advantage to add to the solution 1–1.5% of a conventional inhibitor in order to reduce or prevent corrosion. The inhibitor has no effect on polymerization of the impregnating oil. Complexes of $BF_3$ with ethers have no corrosive effect on metallic apparatus or materials.

It will be understood that this invention is not limited to the materials, conditions, steps and other details specifically described above and can be carried out with various modifications. Thus, in carrying out the invention any kind of wood, into which impregnating oil has been introduced, can be treated. Impregnation with the oil can be carried out in any suitable manner, e.g. by immersion in an open container, or under pressure according to conventional methods. Any kind of oil capable of polymerization and/or resinification can be used, but tar oils, especially coal tar oils, are preferred. The amount of oil in the wood to be treated corresponds to conventional standards. Heating of the wood treated with $BF_3$ addition compounds promotes and expedites polymerization and hardening.

The parts and percent mentioned above are by weight if not otherwise stated.

What is claimed is:

1. A process for the treatment of wood treated with an oil obtained by distillation of coal tar, comprising contacting said wood with the solution of an addition compound of boron trifluoride and a substance selected from the group consisting of organic acids, hydrofluoric acid, alcohols, phenols, ethers and water in order to polymerize said tar oil and harden the surface of the wood.

2. A process as claimed in claim 1, in which an addition compound of $BF_3$ with an organic acid is used.

3. A process as claimed in claim 1, in which an aqueous solution of $HBF_4$ is used.

4. A process as claimed in claim 2, in which an addition compound of $BF_3$ with formic acid is used.

5. A process as claimed in claim 2, in which an addition compound of $BF_3$ with acetic acid is used.

6. A process as claimed in claim 1, in which the resulting wood is subjected to heating.

References Cited in the file of this patent
UNITED STATES PATENTS

| | | |
|---|---|---|
| 1,463,884 | Gardner | Aug. 7, 1923 |
| 1,739,597 | Kessler | Dec. 17, 1929 |
| 1,886,759 | Taylor | Nov. 8, 1932 |
| 2,066,583 | Shipley | Jan. 5, 1937 |
| 2,425,671 | Crandall et al. | Aug. 12, 1947 |
| 2,439,108 | Staehle | Apr. 6, 1948 |
| 2,478,451 | Berger et al. | Aug. 9, 1949 |
| 2,766,312 | Serniuk | Oct. 9, 1956 |